United States Patent [19]

Even-Tov

[11] Patent Number: 5,281,815
[45] Date of Patent: Jan. 25, 1994

[54] METHOD OF DETERMINING THE HUMIDITY AND TEMPERATURE OF ATMOSPHERIC AIR

[75] Inventor: Ori Even-Tov, Lansdale, Pa.

[73] Assignee: AAI Corporation, Cockeysville, Md.

[21] Appl. No.: 845,084

[22] Filed: Mar. 3, 1992

[51] Int. Cl.$^5$ ............................................. G08B 23/00
[52] U.S. Cl. .................................. 250/339; 250/340; 250/338.5; 340/968
[58] Field of Search ...................... 250/338.5, 339, 340; 340/602, 968; 342/26

[56] References Cited

U.S. PATENT DOCUMENTS

| | | | |
|---|---|---|---|
| 4,795,253 | 1/1989 | Sandridge et al. | 250/338.5 |
| 4,965,573 | 10/1990 | Gallagher et al. | 340/968 |
| 5,117,359 | 5/1992 | Eccles | 340/968 X |

FOREIGN PATENT DOCUMENTS 9204698 3/1992 World Int. Prop. O. .......... 340/968

OTHER PUBLICATIONS

Elson, "Radiometer Studied as Turbulence Sensor," Aviation Week and Space Technology, May 1975, p. 30.
Goldberg, "Meteorological Infrared Instruments for Satellites", Society of Photo-Optical Instrumentation Engineers Journal, vol. 9, Nov. 1970, pp. 22-31.
Herget et al., "Remote Fourier Transform Infrared Air Pollution Studies", Optical Engineering, vol. 19, No. 4, Jul.-Aug. 1980, pp. 508-514.
Wark et al., "Nimbus Satellite Infrared Spectrometer Experiment," IEEE Transactions on Geoscience Electronics, vol. GE-8, No. 4, Oct. 1970, pp. 264-270.

Primary Examiner—Constantine Hannaher
Assistant Examiner—Edward J. Glick
Attorney, Agent, or Firm—Griffin, Butler, Whisenhunt & Kurtossy

[57] ABSTRACT

A method is provided for determining the humidity and temperature of atmospheric air at selected distances along a field of view by passive IR spectrometry. An IR spectrometer is provided. A plurality of IR power densities values received by the spectrometer along the field of view at a plurality of discrete, selected IR wavelengths are measured. A set of equations which equate the measured IR power density to functions of temperature and humidity at the selected wavelengths is provided. From the set of equations the temperature and humidity of the atmospheric air along the field of view at selected range segments along the field of view are calculated.

29 Claims, 6 Drawing Sheets

| 0 SEC | 30 SEC | 60 SEC |
|---|---|---|
| SCAN MODE | ZOOM MODE | |

REDUCED SCAN RATE

| 0 SEC | 15 SEC | 30 SEC | 45 SEC | 60 SEC |
|---|---|---|---|---|
| SCAN MODE | ZOOM MODE | SCAN MODE | ZOOM MODE | |

REDUCED SCAN RESOLUTION

METHOD OF DETERMINING THE HUMIDITY AND TEMPERATURE OF ATMOSPHERIC AIR

The present invention relates to a method of determining the humidity and temperature of atmospheric air at different distances from a point of observation along elevations above ground level by passive IR spectrometry. More particularly, the invention relates to such determinations over large volumes of atmosphere with resolution and accuracy sufficient for weather analysis, weather prediction, and mapping of local weather instabilities and disturbances and the like. For example, forest fires, areas of pollution, and unstable weather conditions, particularly such unstable weather conditions which can form hazards, such as hurricanes, tornadoes, wind shears, and the like, may be determined.

BACKGROUND OF THE INVENTION

The art has long sought to determine atmospheric disturbances which might adversely affect persons and property in or along the path of that disturbance. For example, the U. S. Forest Service has attempted to determine disturbances in the atmosphere which indicate the presence of a forest fire at some distant location. The U. S. Weather Service has attempted to detect the presence and movement of discontinuities in the atmosphere which indicate the presence or the likelihood of some hazardous condition, such as heavy rainfalls, hurricanes, tornadoes and the like. The U. S. Federal Aeronautics Administration has attempted to detect the presence or likelihood of discontinuities in the atmosphere in and around airports, which discontinuities indicate the presence or likelihood of weather conditions hazardous to aircraft landing or taking off from an airport, such as squall lines, wind shears and the like.

A number of different approaches for detection of such disturbances has been proposed in the art, but each of the approaches has its own advantages and disadvantages. For example, satellite pictures are useful in determining such hazards, but those pictures show only developed hazards and cannot show the likelihood of those hazards developing, especially in connection with transitory or very localized disturbances, such as tornadoes. Ground-observed or balloon-observed disturbances are detected, but in order to accurately detect and map the progress of such disturbances, a great number of such observations are required, and in many locations, such number of observations is simply not practical.

These difficulties in detecting such disturbances are particularly disadvantageous where the disturbances present imminent danger to property or persons, such as persons aboard an aircraft taking off or landing at airports. In this regard, the art has sought to detect the presence or imminent formation of such disturbances by a variety of methods, operated either from ground installations or from aircraft. Radar is a very common technique for such detection, but radar is able to detect, primarily, only developed hazards and then only when the developed hazards have sufficient reflectivity to make radar detection accurate. In addition, such radar installations are quite expensive, both for initial installation and for operation and maintenance, which makes such installations unsuitable for lower volume airports, in view of the cost thereof.

For a number of years, the art has sought to provide passive infrared radiation detection of such disturbances. Infrared radiation detection equipment is far less expensive than radar, for example, in terms of initial installation, maintenance and operation, but prior art infrared detection systems have suffered from considerable disadvantages. For example, an existing or developing wind shear near an airport can be detected by passive infrared spectrometry due to the difference in temperature between the ambient atmospheric air and the cooler air forming or about to form a wind shear. However, in order to make such detection accurate, it is necessary to very accurately measure the temperature of air at various azimuths, elevations and distances from the observation point. Particularly, for wind shear, that accuracy must be, preferably, within several degrees centigrade, and at least within about 8° to 10° C., or otherwise developing or present wind shears will not be detected or substantial numbers of false detections will occur.

One of the earliest passive infrared detection devices is disclosed in U.S. Pat. No. 3,103,586, issued on Sep. 10, 1963. This patent points out that prior methods for determining the distance or range of an object, e.g. an aircraft, by use of radar or radio-direction finding equipment but such techniques are susceptible to a variety of jamming techniques, as might be practiced, for example, by an enemy aircraft. The patent proposes that such an object, e.g. an aircraft, be detected and ranged by use of infrared radiation, emanating from that object, e.g. an aircraft, itself. The patent points out that such ranging method depends upon a determination of the concentration and distribution of infrared adsorbing gases in the air, but that the major constituents of air, i.e. oxygen and nitrogen, do not have absorption bands in the infrared. Therefore, the patent points out that the two other major gases in atmospheric air, i.e. carbon dioxide and water vapor, can be used for such ranging method. The method is applicable where the object of interest, or target, emits heat, and, hence infrared energy. The distance or ranging of that object can be theoretically determined from the fraction of infrared energy adsorbed by carbon dioxide or water vapor in the path of observation to the aircraft.

It is quite obvious, however, that in order for such a system to be accurate, the concentration and distribution of the carbon dioxide and water vapor in the path of observation must be known. Fortunately, as pointed out in that patent, the concentration and distribution of carbon dioxide in the atmosphere is relatively constant up through about 100,000 feet. However, the concentration and distribution of water vapor in the atmosphere is quite variable. Therefore, unless one knows the concentration and distribution of water vapor in the path of observation, accurate ranging cannot be accomplished by infrared absorption of water vapor. For this reason, the art has concentrated on such ranging techniques by infrared absorption of carbon dioxide, since the concentration thereof is relatively constant. This approach, nevertheless, has the inherent accuracy of the absorption of infrared energy in the path of observation caused by water vapor therein.

U.S. Pat. No. 3,117,228, issued on Jan. 7, 1964, discloses that the accuracy of such ranging method, based on carbon dioxide absorption, may be improved. That improved accuracy is based on the discovery that there are spectral bands in which carbon dioxide preferentially absorbs infrared radiation, as opposed to other spectral bands. Thus, that patent proposes determining the distance of a hot object by detecting the infrared radiation from that hot object, e.g. an aircraft, by utilizing the property of selective atmospheric infrared attenuation.

With the realization that microbursts or wind shears are causes of past tragic aircraft crashes, particularly when landing or taking off from an airport, considerable effort was expended in the art to adapt the ranging techniques, discussed above, to the detection of microbursts or wind shears ahead of an aircraft or near an airport. Thus, U.S. Pat. No. 4,342,912, issued on Aug. 3, 1982, discloses that air disturbances created by low level wind shear can be detected by air temperature gradients existing at different distances from the observer, e.g. an aircraft or airport. That patent points out that when using filters having different infrared frequency band passes, the effective sensed distance is different for each filter. Hence, the device is thus able to sequentially sense temperatures at different distances and, more particularly, sense temperature variations at different distances. Such different sensed temperatures can, therefore, be used to detect microbursts and wind shear. However, like the prior art, this method is also based on absorption by carbon dioxide and suffers from the disadvantage of the errors introduced by the infrared absorption of water vapor.

U.S. Pat. No. 4,937,447, issued on Jun. 26, 1990, improves upon the method of the above-discussed patent in the discovery that two infrared bands of naturally occurring carbon dioxide, i.e. in the 13 to 15 micron region and in the 3 to 5 micron region, provide different sensitivities. In, particularly, the 4.15 to about 4.2 micron band, mainly, regularly spaced carbon dioxide trace lines, free of interfering spectral lines of nitrous oxide, methane, ozone, and water vapor, are found. Accordingly, temperature differences of a column of atmospheric air and ambient air are obtained by sequentially sensing the intensity of at least two spectral peaks in the 4.17 to 4.2 micron region. Changes in the relative intensity of the spectral peaks indicate a change in the temperature of air within the column of atmospheric air and ambient air. This change in temperature is indicative of an air disturbance, such as clear air turbulence or wind shear. A Fabry-Perot device is used for sequentially sensing the preselected wavelengths.

U.S. Pat. No. 4,965,572 points out that even though such infrared detecting devices, as described above, can measure air temperature gradients associated with wind shear, and the like, based on carbon dioxide absorption, the conclusion of a wind shear on the basis of the determined temperature gradients alone will not provide the degree of accuracy and reliability desired, in terms of minimizing both the number of instances of wind shear that are missed and the number of instances where wind shear is falsely indicated. That patent, therefore, proposed incorporating the data from such infrared detecting methods with other data associated with the aircraft for determining a hazard factor which is indicative of possible wind shear. To improve existing infrared sensing devices, the patent also proposes the use of a multispectral infrared spectrometer for controlling the infrared frequency band pass and, thus, the effective sensed distance.

U.S. Pat. No. 4,965,573, issued on Oct. 23, 1990, seeks to further improve the detection of wind shear and the like, by use of a scanning, multi-spectral radiometer which sweeps an approximate 60° path in front of an aircraft. The radiometer employs two rows of detectors that are slightly offset, i.e. about 7° apart in elevation, resulting in two simultaneous measurements of IT attenuation, based on carbon dioxide absorption. That dual information allows the continuous measurement of atmospheric vertical temperature gradients, or lapse rate, for use in determining atmospheric stability and, hence, the probability of microburst occurrence.

While using carbon dioxide absorption as the basis of the method, this patent acknowledges that water vapor, in the atmosphere under observation, may cause errors in the measured absorption/extinction characteristics. To mitigate these errors, the patent uses two filters (and one reference filter) for measurement of a lapse rate when the humidity is low and a different set of two filters (and one reference filter) when the humidity is high. For this selection of sets of filters, the humidity at the aircraft is measured, and this information is used to determine which set of two filters and a reference filter to use. This method, however, assumes that the humidity along the entire line of sight to the wind shear (impending or in progress) is the same as the humidity measured at the aircraft. This assumption may be valid for short distances, e.g. 1 Km, but it is not valid for long distances, e.g. 20 Km. This assumption, also, leads to 10 to 20% error in range calculations (as indicated in the patent) due to uncertainty in the humidity distribution. Such errors are quite unacceptable for any reasonable method for establishing overall weather conditions and usually unacceptable for attempting to accurately locate local weather disturbances. For example, in mapping weather at ranges up to 20 Km, a 20% error will distort the map by 200 meters at 1 Km and 4 Km at 20 Km; this is an unacceptable error.

Thus, all of the prior methods for remote sensing and ranging of atmospheric air temperatures, as discussed above, are necessarily based on the assumption that the water vapor which exists between the point of observation and the weather event under observation is either constant along the entire path of observation or is insignificant. In reality, however, for example, water vapor in a 360° observation and at up to a 20 Km radius for mapping purposes, is neither constant nor insignificant.

In commonly used absorption ranges, such as 10 to 14 microns, the water vapor may effect the absorption extinction as much as or even more than the carbon dioxide itself (depending upon the humidity levels), and, unlike carbon dioxide, water vapor is not evenly distributed in the atmosphere. Not considering the water vapor content can result in very substantial inaccuracies in both range and temperature calculations. For example, a 2 Km localized patch of high humidity in the direct line of sight under observation can lead to erroneous air temperatures, based on IR extinction of carbon dioxide alone, by as much as 35° C. (where a 10° to 20° C. change in temperature gradient is enough to cause very serious weather events). This means that the prior art techniques, discussed above, are correct only in the special cases of no (or very low) humidity, or where the local humidity can be validly assumed to be the humidity along the path of observation. In all other cases, erroneous measurements, impaired detection probability and false alarms will result.

Unfortunately, while the art appreciated the above-discussed significance of water vapor in such determinations, the art could find no practical way of accounting for or calculating the water vapor in the path of observation. Under the circumstances, all of these prior art methods have been found to be too inaccurate for use in weather mapping at significant ranges or for accurately determining weather events.

Further, for any practical weather mapping, temperature, alone, is not sufficient, and a practical weather map must include humidity. Accordingly, these prior art methods are not useful for producing a weather map.

It would, therefore, be of substantial advantage to the art to provide a method with which the accuracy of such infrared measurements of atmospheric conditions is substantially improved and, particularly, where the water vapor content of a path of observation can be determined with distance so as to very substantially improve the accuracy of the determinations and provide weather mapping.

SUMMARY OF THE INVENTION

The present invention is based on several primary discoveries and several subsidiary discoveries. First of all, it was discovered that a particular profile of temperature as a function of range and a particular profile of humidity as a function of range along a field of view (FOV) under observation produce a distinct pattern of infrared power density as a function of wavelength, at the point of observation. This distinct pattern may be referred to as a "signature". Thus, it is possible to produce a profile of temperature and humidity at different distances (ranges) from the point of observation along a selected FOV. This profile of temperature and humidity at different ranges is a result of the fact that infrared extinction, which is the rate of loss of power density through the air, is a function of wavelength.

A further primary discovery is that multiple wavelength values can be used to generate multiple equations, and that it is possible to solve these equations for the values of temperature and humidity in the profile using the power density versus wavelength signature as received at the point of observation.

As a subsidiary discovery, it was found that several bands in the IR range which are free of extinction caused by $CO_2$ are most useful in solving these equations. Since the other major constituents in the atmosphere, e.g. $N_2$, $O_2$ and $O_3$, are also non-contributors to extinction in these bands, these bands have only the extinction caused of water vapor. Thus, by using these bands, total extinction is due to humidity only. Two such major bands are 7 to 9 microns and the 3 to 3.9 microns bands in which the extinction due to carbon dioxide is zero for all practical purposes.

In light of these discoveries, the profiles of temperature and humidity can be determined by solving sets of equations involving the sums of extinctions at preselected range segments where the preselected range segments are treated, mathematically, as separate contributing units. These equations are based on the discovery that the total power density received by an IR detector is the sum of the individual power densities contributed by each preselected range segment in the FOV as a function of wavelength. In other words, the power density received at the detector at each wavelength is the sum of the power density contributions at the wavelength of all of the preselected range segments in the FOV.

Thus, by measuring the IR power density at a plurality of selected discrete wavelengths along a FOV, a set or sets of equations can be provided which equate power density to functions of temperature and humidity of the atmospheric air along the field of view at selected segments along that field of view. By solving the set of equations, the temperature and humidity along the field of view may be calculated.

However, while such set of equations can be generated from known equations, all such sets of generated equations are non-linear, simultaneous equations. Analytical solutions of such sets of equations are not believed to be practical for present purposes, but it was found that the sets of equations may be practically solved by iteration, using approximations for temperature and humidity and continuing the iterations until the solutions converge.

It was found that for reasonable range resolution, there is required at least 5 equations, and preferably 10 or 20 equations, which in turn require, respectively, 5, 10 or 20 measure power densities at, respectively, 5, 10 or 20 discrete wavelengths.

If a large number of fields of view are used, e.g. for 360° azimuth and 30° elevation in weather mapping, a very large number of equations is involved. To allow solution of such a large number of equations, it was found, as a primary discovery, that calculated values of temperature and humidity in a preceding field of view very adequately served as first approximations in a next adjacent succeeding field of view, so as to materially shorten the necessary calculation time.

Further as a primary discovery, it was found that the time of calculations for the very first field of view could be materially shortened if that field of view used as first approximations actual, measured temperatures and humidities along a path adjacent that first field of view.

Thus, broadly stated, the present invention provides a method of determining the humidity and temperature of atmospheric air at selected distances along a field of view by passive IR spectrometry, comprising providing an IR spectrometer, measuring the values of a plurality of IR power densities received by the spectrometer along the field of view at a plurality of discrete wavelengths, providing a set of equations which equate IR power density to functions of temperature and humidity at selected wavelengths, and calculating from the set of equations the temperature and humidity of the atmospheric air along the field of view at selected range segments along the field of view.

Further, the method provides the measuring of the values of temperature and humidity of air at about ground level at each of a series of positions spaced along a generally radial path extending from near the spectrometer, directing the spectrometer to a first, reference field of view extending near that path, measuring the values of IR power density received by the spectrometer along the reference field of view at a plurality of discrete wavelengths, and calculating from the set of equations the temperature and humidity of the atmospheric air along the reference field of view at selected range segments using the values of temperature and humidity measured along the path as first approximations for solutions of the equations.

DETAILED DESCRIPTION OF THE INVENTION

As noted above, the present invention relies on the solving of at least one set of equations which equate IR power density ($P_\lambda$) with functions of temperature and humidity. Such equations are derived by the general IR power density equation:

$$P_\lambda = \int_0^\infty \epsilon_\lambda \, h(R) \, W(T(R), \lambda) \, e^{-\sigma_\lambda H(R)} dR \quad (1)$$

where $$H(R) = \int_0^R h(r) dr$$

and where h is the humidity profile as a function of range,

T(R) is the temperature profile as a function of range, $\epsilon_\lambda$ is the emissivity at wavelength $\lambda$, $W(T(R),\lambda)$ is Planck Blackbody equation, and $\pi_\lambda$ is the extinction coefficient at wavelength $\lambda$.

R and r are variables denoting the range of interest.

A number of different equations can be derived from this general power density equation, depending on the parameters of the field of view, all of which will equate power density to functions of temperature and humidity, and any of such equations may be used for purposes of the calculations of the present invention. The particular derived equations are not critical so long as the equations relate power density to functions of temperature and humidity.

However, it has been found that certain derived equations are particularly useful for the calculations of the present invention and are, therefore, the preferred equations. The following will explain the logic of these preferred equations.

This logic is based on the concept that the power density received at an IR spectrometer at each wavelength $\lambda_j$ is the sum of the power density contributions at $\lambda_j$, of all range segments in the field of view. Mathematically, this relationship can be written as follows for each wavelength:

$$W_j = \Delta W_{1j} + \Delta W_{2j} + \Delta W_{3j} + \ldots \Delta W_{Nj} + \Delta W_{Res\,j}$$

where $W_j$ = the output of the IR detector of the IR spectrometer at wavelength $\lambda_j$, which represents the equivalent power density at wavelength j;

$\Delta W_{ij}$ = the contribution of power density range segment i to the total power density in wavelength j;

$\Delta W_{Res\,j}$ = the power density contribution of residual range segments, defined as all segments extending from the last predetermined range segment to infinity; and N = the number of preselected range increments.

From the above equation, it can be seen that each added range segment adds another term to the equation, and since each term contains two unknown variables (temperature and humidity), it follows that by selecting the resolution of the range (the number of segments), the number of unknown variables in each equation is also selected. Thus, the number of unknown variables in the equation is 2(N+1), for N preselected range segments plus the residual range segment, i.e. from the last range segment to infinity.

One such equation will be generated for each selected wavelength $\lambda_j$ and since the power density at a plurality of wavelengths, e.g. ten wavelengths, must be generated, this results in a set of simultaneous, non-linear equations in 2(N+1) unknowns. Accordingly, this set of equations can be solved only if there are 2(N+1) equations. The 2(N+1) equations are generated by the unique power density measurements at discrete wavelengths. A multi-spectral, Fourier Transform IR (FTIR) spectrometer is an ideal apparatus for obtaining such wide-band power density measurements. For general weather mapping, the preferred IR bands are 7 to 9 microns and 3 to 3.9 microns. A resolution of 0.05 micron is readily achievable with such a spectrometer. Using these bands and a wavelength resolution of 0.05, some 60 separate equations, each for a different $\lambda_j$, can be generated, representing, for example, 19 range segments of one kilometer each. Assuming the range of interest is 20 Km (for example, around an airfield), 60 equations will result in a range resolution of about 700 meters. Within each resolution segment, 700 meters long, the profile of humidity and temperature are considered unchanging and the solution of the set of equations yields a weighted average value for these variables in each segment.

It will also be appreciated that once the humidity profile is calculated for a FOV it becomes relatively easy to materially improve the range resolution by adding many new equations taken from IR bands outside of the above-noted preferred bands and bands in which both $H_2O$ vapor and $CO_2$, or primarily $CO_2$, act as extinction gases. This is true because having already calculated the average humidity level for each segment and since the extinction of $CO_2$ is essentially constant and known, as demonstrated by the prior art references discussed above, good approximations of the total extinction and total emissivity values needed for the solutions of the equations, which include, for example, both $H_2O$ vapor and $CO_2$ as variables, are, thus, available.

These plurality of non-linear simultaneous equations, of course, do not yield to practical analytical solution techniques for present purposes and numerical optimization methods are required. Many such methods are known and may be used, but the Newton-Raphson method is a preferred technique. This method (as well as other similar methods) uses techniques of iterative solutions in a process of converging the solutions to within a given tolerance. This iterative process starts with a set of approximated values for the unknown variables. Each new iteration provides new corrections to the set of variables that, when substituted in the equations and summed up, the summation is compared to the measured values of $W_j$ at the spectrometer to determine the degree of convergence. When the difference between the calculated value and the measured value, for all $W_j$'s, is within a preselected tolerance, the values have converged. Preferably, the equations are solved to an accuracy of convergency such that the solutions of each equation provide a value within 15%, more preferably within 10% and yet more preferably within 5%, of the values of solutions of all other equations in the set.

The probability of correct convergence and the time required for convergence, even with modern high-speed computers, depends on the quality of the original set of approximations. Therefore, the quality (accuracy) of the first set of approximations for the equations is critical to achieving a quick and accurate solution of the equations.

An important feature of the present invention entails a method of selecting a quality set of first approximations for each FOV. For example, a weather map, constituted by 360° azimuth and 60° of elevation with ranges up to 20 Km will require an extremely large number of individual fields of view. Quality approximations must be provided for each field of view, since, otherwise, the time for solving the large number of sets of simultaneous, non-linear equations, even with high-speed computers, could be quite long and quite impractical.

An underlying basis for selecting quality approximations for each field of view is that natural variations in temperature and humidity occur gradually over time and space. When each FOV is at a small angular increment and taken in a relatively short increment of time, it was found that the solution of the equations for humidity and temperature of one FOV admirably serves as quality first approximations of the humidity and temperature for the next adjacent FOV.

Using this procedure for an entire scanning sequence of the large number of fields of view necessary for weather mapping, yields a self-sustained scanning procedure, which contains an efficient means for rapid and proper convergence of the equations in solving for humidity and temperature values for each segment of a FOV in the sequence. This method supplies a readily available set of quality first approximations for each FOV and facilitates a rapid convergence of solutions of the equations for each FOV, which are essential for "real time" scanning and weather mapping.

While the foregoing provides quality approximations for a sequential FOV, based on the calculated values of temperature and humidity from an immediately preceding FOV, it is apparent that the very first calculated FOV will have no preceding FOV approximations. Thus, a further important feature of the invention pertains to finding a quality set of first approximations for the first FOV. In this regard, the quality of the first approximations may vary from poor to very accurate. Indeed, the equations for the first FOV could be solved simply by guesses at the temperature/humidity profile along that first FOV, i.e. a "brute force" solution, if time for such solutions is virtually unlimited.

A quality set of first approximations for the first FOV can be obtained by a reference field of view (RFOV). The RFOV relies upon a plurality of transmitting sensor stations, e.g. 5 to 50 stations. Each of these stations has temperature and humidity sensors and a transmitter which relays the temperature and humidity data to a central computer operating at the system location. All of these sensor/transmitter stations are positioned along a general radial path extending from the point of observation, e.g. the spectrometer. The humidity and temperature data is transmitted to a central computer and becomes the very first set of approximations of temperature and humidity along the reference field of view for solving the equations. This data for the reference field of view acts as a "primer" for the calculations along each succeeding FOV. Of course, the closer the RFOV to the path of sensor stations, the higher the quality of these first approximations. Hence, generally, the RFOV is chosen such that it is in close proximity to and generally parallel to the path of the sensor stations. As scanning of fields of view continues along 360° azimuth, and e.g. 60° elevation, eventually a field of view will again coincide with the reference field of view. Every time this coincidence occurs, the data from the sensors may be used as the approximations. Thus, as fields of view are sequentially scanned in small angular intervals, making each subsequent FOV directly adjacent to a preceding FOV, the conditions for the self-sustained solutions are maintained.

The discrete humidity and temperature data, calculated from the equations for each FOV, is stored in a weather data base together with its associated azimuth, elevation, range and absolute time of measurement. This data base can then be used for analysis and/or display. Analysis may consist of weather stability considerations, wind vector analysis, visibility, precipitation, and weather phenomenon in progress, such as wind shear and tornadoes. The raw data (temperature, humidity, azimuth, elevation, range and time), as well as the results of the analysis, can be displayed in two or three dimensions, as explained below.

Thus, the present invention provides a comprehensive data base relevant to atmosphere temperature and humidity content, along a plurality of fields of view at preselected range segments. The resultant data base contains information of humidity and air temperature in three dimensions. The display of this data can be varied as desired in any or all of the three axis of azimuth, elevation and range. This control of the display can be applied to the entire volume of atmosphere under study or to any portion thereof.

The data base is, preferably, arranged in records or "cells". Each record or "cell" contains the following data: 1) the cell's position in azimuth, 2) the cell's position in elevation, 3) the cell's position in range, 4) the cell's temperature, 5) the cell's humidity, 6) the absolute time of the data measurement, 7) the spatial position of the range segment, and 8) the spatial position of the FOV. A data base, therefore, can be used for atmospheric analysis and mapping, including analysis of movement of bodies of air and their rate of motion. This data base can also be used to detect and locate fires, such as forest fires when IR wavelengths with $CO_2$ extinctions are used. Likewise, this data base can also be used to detect, locate and analyze chemical/gas emissions.

Figure 1:
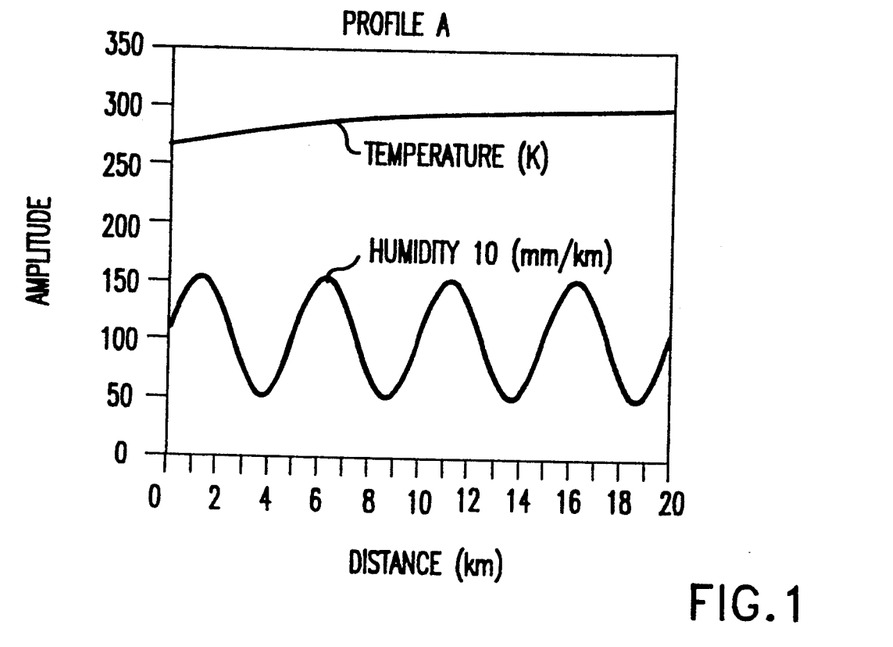
FIG. 1 is a diagrammatic illustration of a temperature and humidity profile of the first typical FOV (Profile A)
Figure 2:
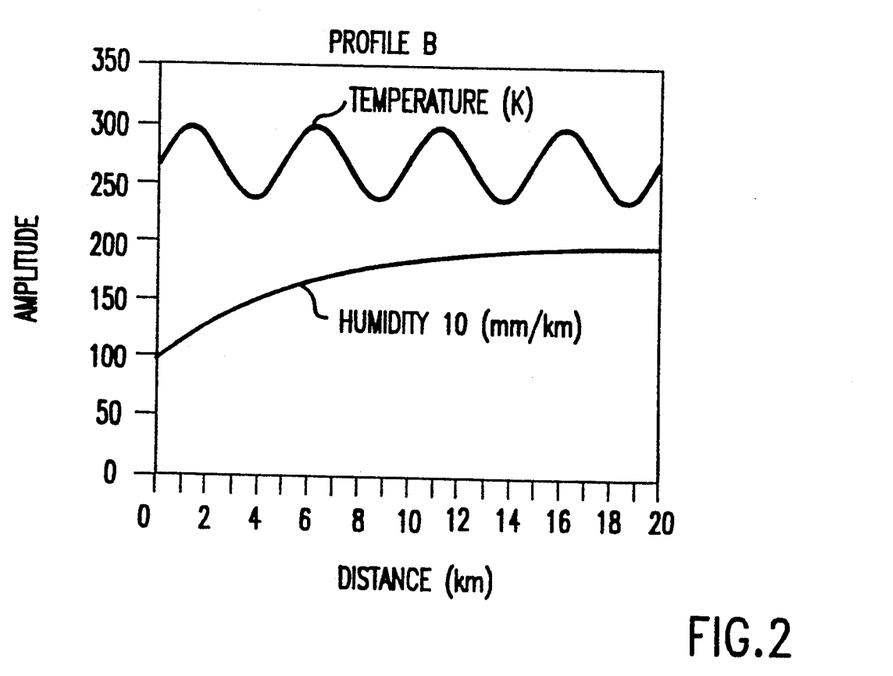
FIG. 2 is a diagrammatic illustration of a temperature and humidity profile of the second typical FOV (Profile B)

As noted above, a first basic discovery in providing the foregoing is that the profile of temperature and humidity of each FOV has a distinct signature in the distribution of power density as a function of wavelength. FIG. 1 illustrates a typical FOV profile (Profile A) in temperature and humidity. FIG. 2 illustrates a further typical profile of another FOV (Profile B). The ordinate of the profiles are given in °K for temperature, mm of H$_2$O vapor per Km (times 10) for humidity, and the distance or range of the abscissa is in Km from the observation point, e.g. the spectrometer.

Figure 3:
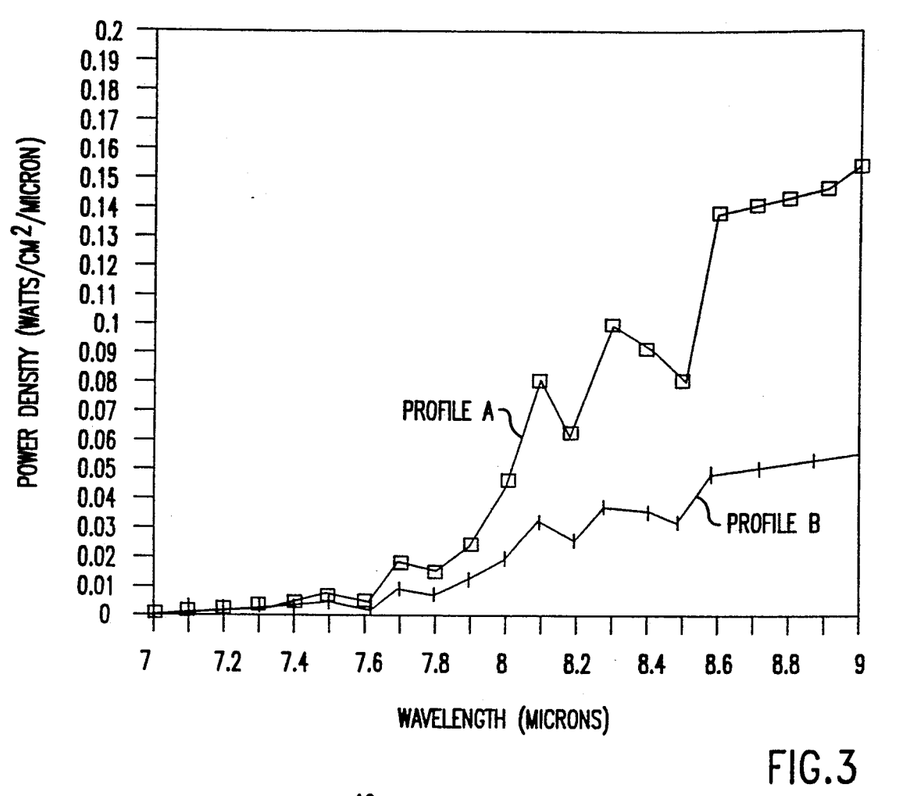
FIG. 3 is a diagrammatic illustration of power density versus wavelength signatures of Profile A and Profile B of FIGS. 1 and 2.

FIG. 3 depicts the signatures of these two profiles (A and B) with power density in the ordinate (watts/cm$^2$/micron) as a function of wavelength (in microns) in the abscissa. It is readily seen that the power density versus wavelength signatures of the two profiles are distinctly different. The power density signature is used to calculate the FOV profile in temperature and humidity, as discussed more fully below.

Figure 4:
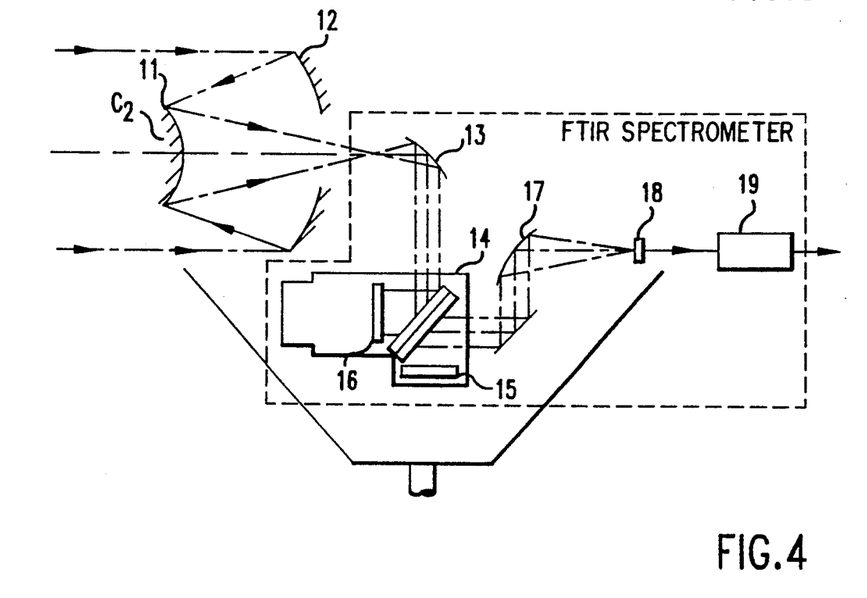
FIG. 4 is a system block diagram of collector optics and spectrometer useful in the present invention.

The power density at selected wavelengths is measured by an IR spectrometer. While any desired spectrometer may be used, a particularly useful spectrometer, as illustrated in FIG. 4 and as known in the art, is a Fourier Transform IR (FTIR). As seen in FIG. 4, this spectrometer has collector optics, generally C$_2$, composed of collection mirrors 11 and 12, which collects emissions in the IR band from a FOV. The emissions are then applied to the FTIR spectrometer consisting of a collimator mirror 13, a beam splitter 14, a fixed mirror 15 and a moving mirror 16. The FTIR spectrometer also has a focusing mirror 17, a detector 18 and an FTIR computer 19. The input to the spectrometer is IR emission in a wide multi-spectra band (e.g. from 3 to 14 microns). The Fourier Transform output of the FTIR spectrometer is a set of values characterizing the power density contents of the input in narrow IR bands, e.g. each 0.05 micron wide.

In other words, the spectrometer, like a frequency analyzer, separates the input emissions, containing a wide band of IR frequencies, into its individual frequency components and indicates the power density in each of these frequency components. Because the frequency and wavelength are interrelated, it can be seen that the spectrometer separates the input into its wavelength components (in power density per micron). Thus, the spectrometer produced the spectrum of the input IR emissions collected from the FOV under observation. This is the IR signature of the FOV.

Figure 5:
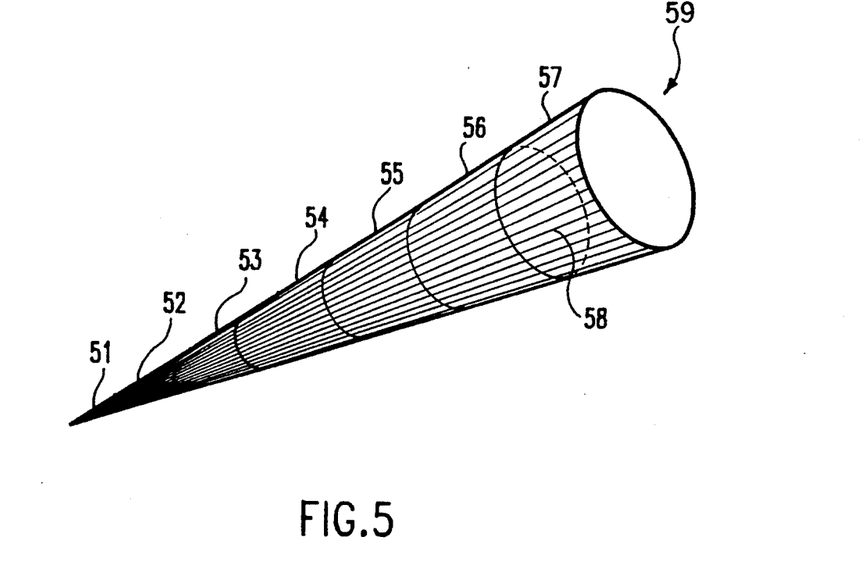
FIG. 5 is a diagrammatic illustration of a single field of view, shown divided into range segments.

In order to reconstruct the FOV profiles in temperature and humidity from this IR signature, it is necessary to equate the power density received at the detector to the summation of the power density contributions of all range segments in the field of view, as briefly discussed above. FIG. 5 shows a FOV with seven range segments 51 through 57 for a field of view, generally, 59. Each contribution of each segment is, of course, multiplied by the extinctions of all intervening segments, which extinctions depend on the length of the segment and the water vapor content of each of the intervening segments.

The original power density signature of each segment is a function of the temperature, the emissivity and the extinction coefficients of that segment. This power density of segment i is denoted as $W_i$. The contribution of segment i to the power density, as measured by the spectrometer is:

$$\Delta W_i = W_i \prod_{m=1}^{(i-1)} T_m \tag{2}$$

namely, the original power density of the segment as radiated through the front surface of the segment (in FIG. 5, the numeral 58) multiplied by all the intervening segment's selective transmissions. $T_m$ is the transmission of the segment m and the transmission is a function of the wavelength dependent extinction for that segment.

In summary, when the emitted signatures $W_i$ of all the range segments in the FOV are known and when all the transmission signatures (the wavelength selective transmission) of all the range segments are known, the total power density ($W_o$) received by the spectrometer is as follows:

$$W_o = \sum_{i=0}^{\alpha} \Delta W_i = \sum_{i=0}^{\alpha} W_i \prod_{m=0}^{i-1} T_m \tag{3}$$

While the total power density is the summation of the individual contributions of all the range segments in the FOV, it is also true that the total received power density at a given wavelength $\lambda$ is equal to the summation of all the segment contributions at that given wavelength. Thus:

$$W_{o,\lambda} = \sum_{0}^{\alpha} \Delta W_{i,\lambda} = \sum_{0}^{\alpha} W_{i,\lambda} \prod_{m=0}^{i-1} T_{m,\lambda} \tag{4}$$

Obviously, as $\Delta$ approaches zero, these functions become a continuous profile function of W and T. If the range segment length values ($\Delta R$) are selected small enough, then these equations amount to the step function fitting of the continuous profile.

Returning to equation 4, the equation can be expanded to:

$$W_{0,\lambda} = W_{1,\lambda} T_o + W_{2,\lambda} T_o T_1 + W_{3,\lambda} T_o T_1 T_2 \ldots \tag{5}$$
$$W_{n,\lambda}(T_o T_1 T_2 \ldots T_{(n-1)}) + W_{Res} \prod_{m=0}^{n} T_m$$

Obviously, $T_o = 1$.

The last term describing the residual power density accounts for the power density contribution of the residual segment ranging from the last range segment (58 in FIG. 5) to infinity. Such an equation (equation 5) can be written for many individual wavelengths $\lambda$. The number of available equations depends on the number of distinct wavelengths for which $W_{o,\lambda}$ can be measured, which in turn depends on the available band widths and the wavelength resolution of the spectrometer.

Each equation 5 is a partial model of the atmospheric power density as received by the spectrometer, at a given wavelength. Each equation has (n+1) terms describing the power density ($W_{i,\lambda}$) and the selective transmission of the intervening segments. It follows that each equation is a partial model that describes (n+1) range segments (including the residual segment). In reality, the $W_{i,\lambda}$ term and $T_i$ term are the unknown variables of the equations and $W_{o,\lambda}$ are the quantities that can be obtained at the spectrometer output, namely the FOV signature values. Since there are two unknowns per term and N+1 terms per equation, it follows that 2(N+1) independent equations are needed to form the complete atmospheric model of each FOV.

The total closed form of this particular model is:

$$W_{oj} = \sum_{i=0}^{n+1} \left( W_{ij} \prod_{m=0}^{i-1} (T_{mi}) \right) \quad (6)$$

where j denotes a wavelength index (J=1 to (2n+2)) and i denotes a range segment index (i=1 to (n+1)). As noted above, other models are possible. For example, a model can be constructed in which the changes in $W_i$ and $T_i$, rather than their absolute values, are used to model the contributions for each range segment. All these related atmospheric models, which describe the contribution of range segments to a power density measurement at a remotely located detector, are applicable to this invention.

The term $W_{i,\lambda}$ is related to the segment's temperature and extinction while the term $T_i$ is the transmission through segment (i) which is a function of the extinction of segment (i). The relationship of each segment power density at a given wavelength to the temperature of the segment is known through Plancks black body radiation law, the emissivity of the segment and the extinction coefficient (see equation 1 above). The transmission of each segment as a function of humidity content of the segment (in precipitable mm of $H_2O$) is a known relationship.

As a result, the model contains 2N+2 non-linear equations in temperature and humidity for each of the range segments. Each $\Delta W_i$ term in the equation has the following factors:

$$W_{ij} = C_j K_{ij} W'_{i,jo}(1 - e^{-\sigma_j H_i R_i}) \quad (7)$$

where
- $C_j$ is the known ratio between specific emissivity and extinction coefficients for $H_2O$ vapor;
- $K_{ij}$ is the ratio between the power density $\lambda_j$ and at $\lambda_o$ (a chosen reference wavelength) for the given temperature of segment i;
- $W'_{i,jo}$ is the power density expended by Plancks law at a reference wavelength $\lambda_o$ and the temperature at i;
- $\sigma_j$ is the specific extinction coefficient for $H_2O$ vapor (in $mm^{-1}$);
- $H_i$ is the absolute humidity (in precipitable mm of water per 1 Km segment); and
- $R_i$ is the preselected length of segment i (in Km).

The transmission of each segment is $T_{ij}$ can also be written as $$T_{ij} = [e^{-H_i R_i}]^{\sigma_j} \quad (8)$$

If all range segment lengths are made equal to a "unit segment length" (USL), then the terms on the right-hand side of equation 7 will be reduced to $$W_{ij} = C_j K_{ij} \times W_{ij,} \times (e^{-\sigma_j H_i}) \quad (9)$$

and $$T_{ij} = e^{-\sigma_j H_i} = (e^{-H_i})^{\sigma_j} = [T_{(H)i}]^{\sigma_j} \quad (10)$$

where $H_i$ is now the humidity content of sector (i) in mm $H_2O$ per range segment length, and where the term $T_{(H)i}$ has no physical meaning but simplifies the understanding of the mathematics involved in the solution of these equations.

The term corresponding to $\Delta W_{ij}$ can be rewritten:

$$\begin{aligned} \Delta W_{ij} &= K_{ij} C_j W_{i,jo}(1 - T_{(H)i}^{\sigma_j}) \times \prod_{m=0}^{i-1}(T_{(H)m})^{\sigma_j} \\ &= K_{ij} C_j W_{i,jo} \left[ \prod_{m=0}^{i-1}(T_{(H)m})^{\sigma_j} - \prod_{m=0}^{i}(T_{(H)m})^{\sigma_j} \right] \\ &= K_{ij} C_j W_{i,jo} [(X_{(i-1)})^{\sigma_j} - (X_i)^{\sigma_j}] \end{aligned} \quad (11)$$

The equations contain the unknown variables $W_{i,jo}$ from which the temperature in the segment i can be back calculated and the term $(X_i)^{\sigma_j}$, which when solved for, will serve to back calculate the humidity $H_i$ (in mm $H_2O/Km$).

From the above, it will be seen that no matter what model equations are chosen, all possible model equations are non-linear equations. The solution of such a set of non-linear equations is practical for present purposes only through one of the iterative methods, such as the Newton-Raphson method. The selection of the actual method depends on several factors, such as speed of convergence, tolerance to errors in initial approximations and the ease of accurate modeling.

The iterative methods for solving non-linear equations involves a routine where a set of approximate solutions is tested and the resulting value of each equation is subtracted from the calculated value. The difference is checked for its closeness to zero or some preselected tolerance, as noted above. If all these differences fall within the preset tolerance level, the process ends, and the solutions are defined. If any of the differences do not fall within the tolerance, then a new iteration begins, providing new corrections to the values of the variables that, when processed as before, provide a new set of test values which either ends or continues the iteration process. When all the differences fall within the preselected tolerance level, the system is said to have converged. This process of solution of the simultaneous non-linear equations is performed by a computer.

Obviously, however, each iteration takes a fixed amount of time. Therefore the number of iterations should be minimized in order to maintain the solution time of each FOV, and eventually the profile time of an entire scan, within a limit that is operationally acceptable. The number of iterations needed for convergence is highly dependent on the quality of the original approximations, i.e. the closeness of these first approximations to the actual values of the solutions.

Figure 6:
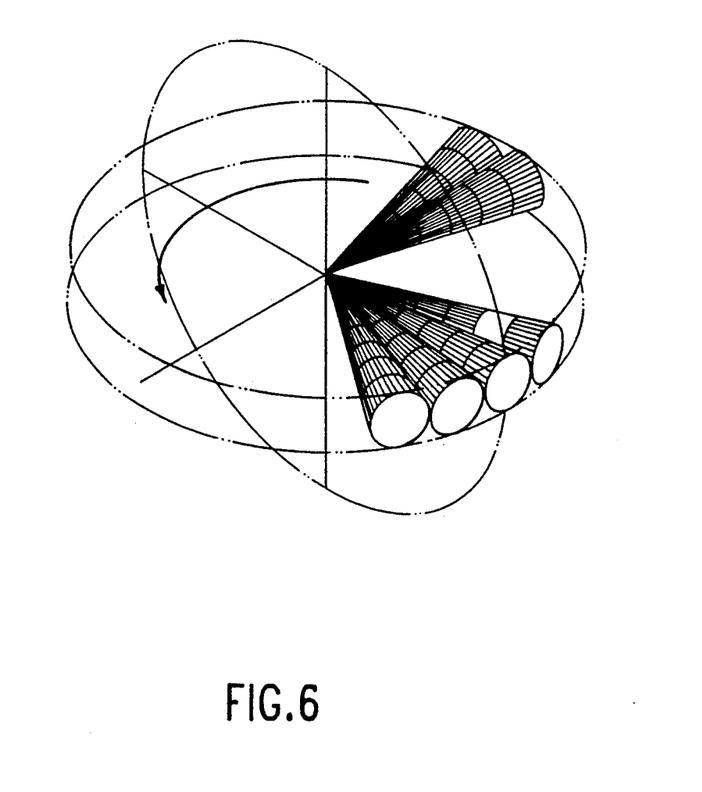
FIG. 6 is a diagrammatic illustration of azimuth scanning of consecutive fields of view.
Figure 7:
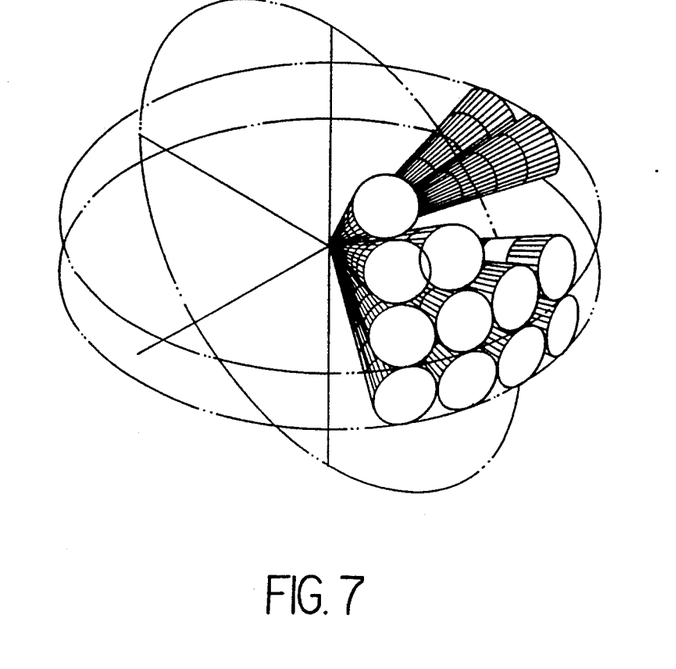
FIG. 7 is a diagrammatic illustration of azimuth and elevation scanning of consecutive fields of view.

A further important feature of the invention is the profiling of large volumes of atmospheric air for temperature and humidity contents. By moving the FOV in a scanning pattern while profiling each scanned FOV for temperature and humidity, a selected volume of atmospheric air may be characterized as to its temperature and humidity contents in each of its volumetric segments. FIG. 6 is an illustration of a horizontal scan of a fixed FOV (fixed in terms of the angel and distance of the FOV) which, when scanned over 360°, will profile a plate-like plane of, for example, 10 Km radius. If the individual FOV is, for example, a 1° cone and has 20 range segments (FIG. 7 illustrates 20 range segments), then at the end of a full horizontal scan the date base, discussed above, will contain 7200 records or "cells" of humidity and air temperature, corresponding to 7200 volumetric segments encompassed during the 360° scan. Besides the temperature and humidity, each record for each of the segments contains the topographic coordinates of the segment, the absolute time of the measurement and the resolution data of the segment (length of range of the segment and value of FOV angle). The data thus generated constitutes the total temperature/humidity topography data in a horizontal, three-dimensional "atmospheric disc".

Figure 8:
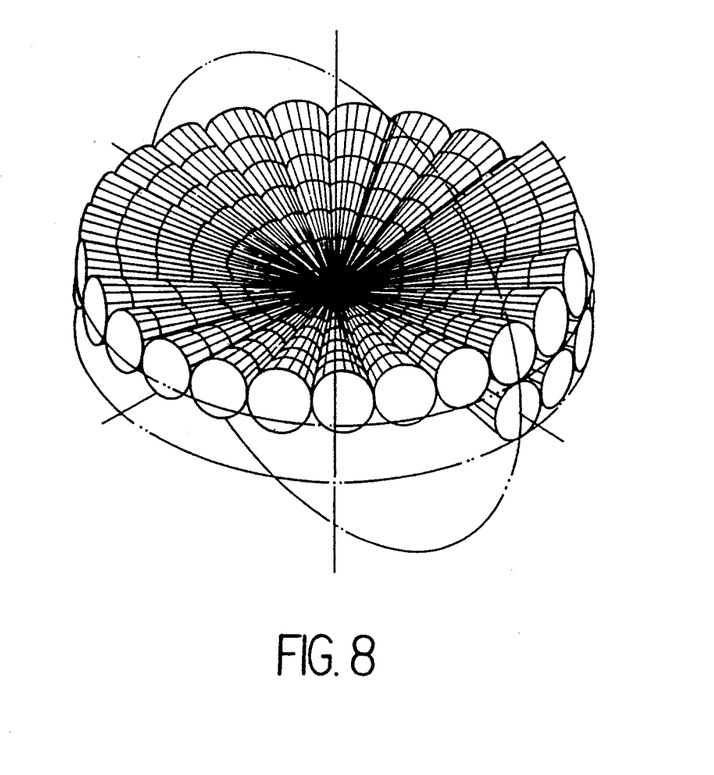
FIG. 8 is a diagrammatic illustration of a spiral effect of azimuth and elevation scanning.

An elevation scan pattern, which will tilt the FOV, for example, one degree upward after each 360° horizontal scan is completed, will constitute a volumetric scan in azimuth and elevation where the volume is scanned by adding layers one on top of the other (see FIGS. 7 and 8). A 360° azimuth and 30° elevation scan with 20 range segments in each FOV will yield a three-dimensional topographic data base of 216,000 records or "cells".

With such large numbers of cells, each requiring solutions of a large number of non-linear, simultaneous equations, as explained above, the solution time for one complete 360° azimuth/30° elevation scan could be quite long and not "real time". The only way to minimize the solution time is to reduce the number of iterations in the solution, and, as explained above, the best means to ensure a minimum number of iterations, and hence lower solution time, is to provide a quality set of initial approximations of temperature and humidity. Thus, an important feature of this invention is that of providing a method of achieving the best possible set of initial approximations.

In order to arrive at this best possible set of initial approximations, as noted above, use is made of the observation that natural variations in temperature and humidity occur gradually for small increments of time and space. Using this observation and the fact that the scanning involves movement of the FOV over small angular increments in a relatively short increment of time, the solution of the humidity and temperature profiles of one FOV may serve as a quality set of first approximations for the humidity/temperature for the next adjacent FOV in the scan sequence.

Using this procedure for the entire scanning sequence yields a self-sustained scanning mechanism, which contains an efficient means for rapid and proper convergence of the humidity and temperature profile calculations of each FOV in the sequence.

Figure 9:
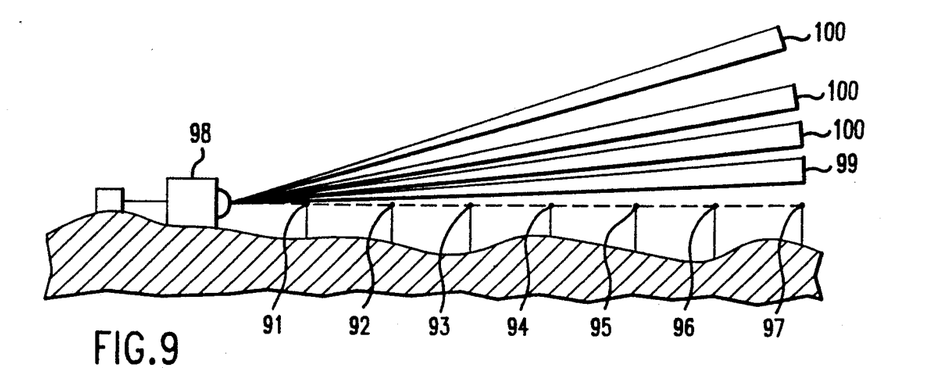
FIG. 9 is a diagrammatic illustration of a side view of a typical arrangement of apparatus for establishing a reference field of view.

Also, as noted above, this self-sustained process still requires "priming" at start-up and reset, where there is no previous data to serve as a quality set of approximations. The solutions of the equations may also benefit from periodic recalibration. For this purpose, as shown in FIG. 9, a reference field of view (RFOV) 99 is established near a plurality, e.g. 5 to 50, especially 20 to 30, transmitting/sensor stations along a line emanating from the spectrometer 98. FIG. 9 shows seven such sensor stations 91 through 97. Each of these stations has temperature and humidity sensors and a transponder controlled by a main transmitter/interrogator of a central computer.

All of these sensor/transponder stations are positioned along a general radial path extending from the point of observation at ranges approximately corresponding to the range segments used in the FOV model, whenever possible. The humidity and temperature data are transmitted to the central computer and become the very first set of approximations for solving the equations for the profile of the RFOV 99. This process acts as a primer (initiator for the self-sustained process) and is used to commence the scanning of other fields of view 100. Every time a subsequently scanned FOV coincides with the RFOV, this process may be repeated.

Thus, FOVs are sequentially scanned at small angular intervals, making each FOV directly adjacent to a preceding FOV. Scanning is done in both azimuth and elevation, with the actual scanning pattern being determined by the scan control portion of the computer. Under all circumstances, scanning is conducted at small angular intervals always maintaining the rule that each succeeding FOV is adjacent to a preceding FOV, so that the conditions for the self-sustained solution method is maintained.

Figure 10:
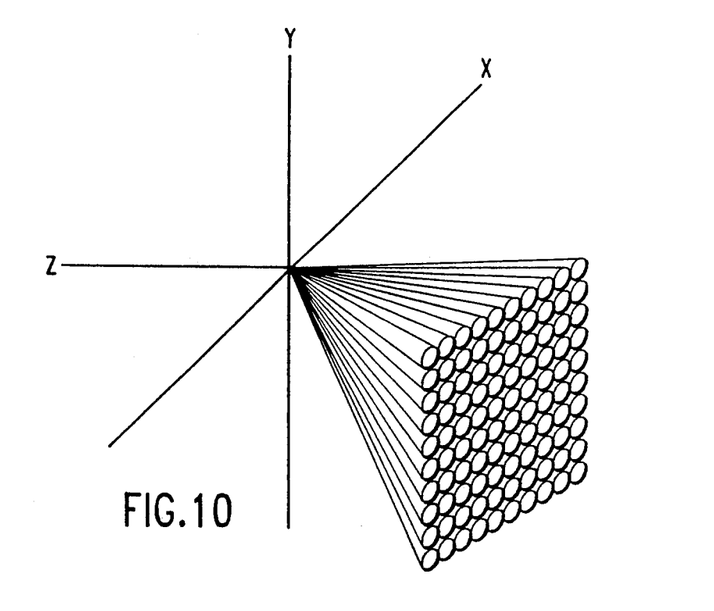
FIG. 10 is a diagrammatic illustration of sector scanning of consecutive fields of view.

An important pattern of scanning is where the scanning is limited to selected angles of azimuth and elevation (sector scanning). FIG. 10 illustrates an example of a sector scan. A 10°×10° sector scan will involve a 10° horizontal scan (azimuth). After each 10° scan in azimuth, the FOV is lifted 1° and the next layer of the scan is conducted. The process will continue until 10 elevation scans are completed, after which the same sector may be scanned again.

Such a sector scan or other special search patterns can be invoked when weather anomalies or atmospheric disturbances are detected. These special search, lock and/or track patterns can be computer controlled in azimuth and elevation to accommodate the size and position of the anomaly. The computer can also be programmed to alter, e.g. improve, the resolution by controlling the size of the segments, through varying the size of the FOV and/or varying the range segment length.

Reducing the angle of the FOV can be done only by optical zooming which can be controlled by the computer. Also, by changing the constants in the signature equations, higher range resolution is achieved as a part of the FOV's profile solution. An examination of the general form of the segment term in equation 11 explains this point. The general form for the contribution of each range segment (i) to the total power density at wavelength $\lambda_j$ ($W_j$) is:

$$\Delta W'_{ij} = K_{ij} C_j W'_{ijo}[(X_{i-1})^{\sigma j} - (X_i)^{\sigma j}] \qquad (12)$$

where $$(X_i)^{\sigma j} = e^{-\sigma j \sum_{m=0}^{i} (H_m R_m)}$$

where $R_m$ is the chosen range segment length in Km and $\sigma_j$ is a specific extinction coefficient of $H_2O$ vapor in units of $mm^{-1}$ and the $H_m$ is humidity. As a result, the solved values of humidity are in units of mm of precipitable $H_2O$ per Km. In order to change the range resolution, only new values of $R_m$ need be inserted into the model equation, and the computed results of $H_m$ are still given in mm of $H_2O$ per Km. From the above, it can be easily seen that range resolution need not be the same for all segments in the FOV. Improved resolution resulting from reduction of segment size in a FOV and/or length of range segments need not involve the entire search; it can be applied to a limited atmospheric volume of special interest. This process of analyzing a selected atmospheric volume at an improved resolution, using smaller segments in the analysis, can be viewed as a three-dimensional zoom process.

Figure 11:
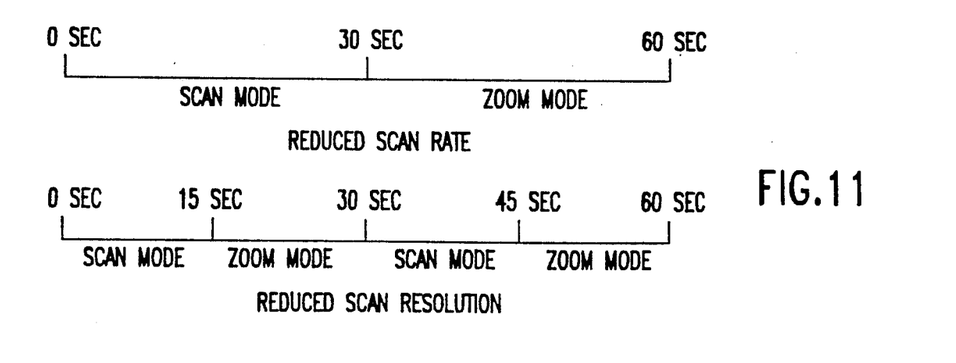
FIG. 11 is a diagrammatic comparison of the effects of time sharing in scanning.

Tracking, sector scanning and zooming can be executed concurrent with the general search task, sharing the available time. For example: A possible atmospheric instability may have a volume described by 6° in azimuth, 2° in elevation and 2 Km in depth and that instability may commence at a 15 Km range from the spectrometer. This instability can be discovered during a normal 360° azimuth × 60° elevation search procedure. It is then possible to conduct the normal 360°×60° search routine at half the usual time and dedicate the other half of the time to zooming in on the suspected unstable volume. This track and search procedure amounts to time sharing of two tasks, each with its own resolution and its respective scan rate (number of scans per minute). The extra time needed for the zooming on the suspected volume can be gained at the expense of reduced resolution and/or reduced scan rate in fulfilling the search task. FIG. 11 illustrates such shared time.

Another important feature of the invention is achieved by the data base storage, which, by the nature of the tasks, requires relatively large storage capacity. For example, the scanned data is stored in the data base occupying a record or "cell" for each segment. Each cell contains the three-dimensional address of the cell and the two parameter values (humidity, temperature) as solved for this cell. It also includes the absolute time at which this particular measurement was done. In addition, the record includes data pertaining to the particular cell resolution in three dimensions. In other words, the cell record is made up of eight fields. Three fields describe the topographic position of the cell. The fourth field contains the measurement time data. The fifth and sixth fields contain the temperature and humidity data. The seventh and eight fields contain the resolution data.

Each block of the data base contains the records of all cells in the atmospheric volume under observation, as resulting from one scan. Several such blocks, each for a consecutive scan, is available in the total data base for analysis of data variations with time (e.g. wind analysis, tornado path, etc.). The data is written into the data base in a FIFO procedure for blocks. The writing of data into a recent block will push out the data of the "oldest" block (if desired).

For 1° FOV with 20 range segments (requiring 1 record per range segment) over an entire scanning sequence, there would be: 360° Az.×60° el.×20 range segments=432,000 records or "cells" of data. For example, at 1 byte per field and 8 fields per record, there would be approximately 4 MB RAM memory required per data block. Using commonly available computers, such a block amounts to a 4 MB memory card and a typical PC mother board can accommodate 8 such cards.

In any case, the total data base, which contains several blocks (say 10 blocks) for several consecutive scans, is used for calculations involving rates of change with respect to time such as wind vectors (velocity and direction) or tornados' path, rate of buildup of localized humidity and rate and direction of advance of a storm. This data base makes it possible to display a great variety of maps. Among others, a normal humidity/temperature "real time" display in polar coordinates may be displayed.

Figure 12:
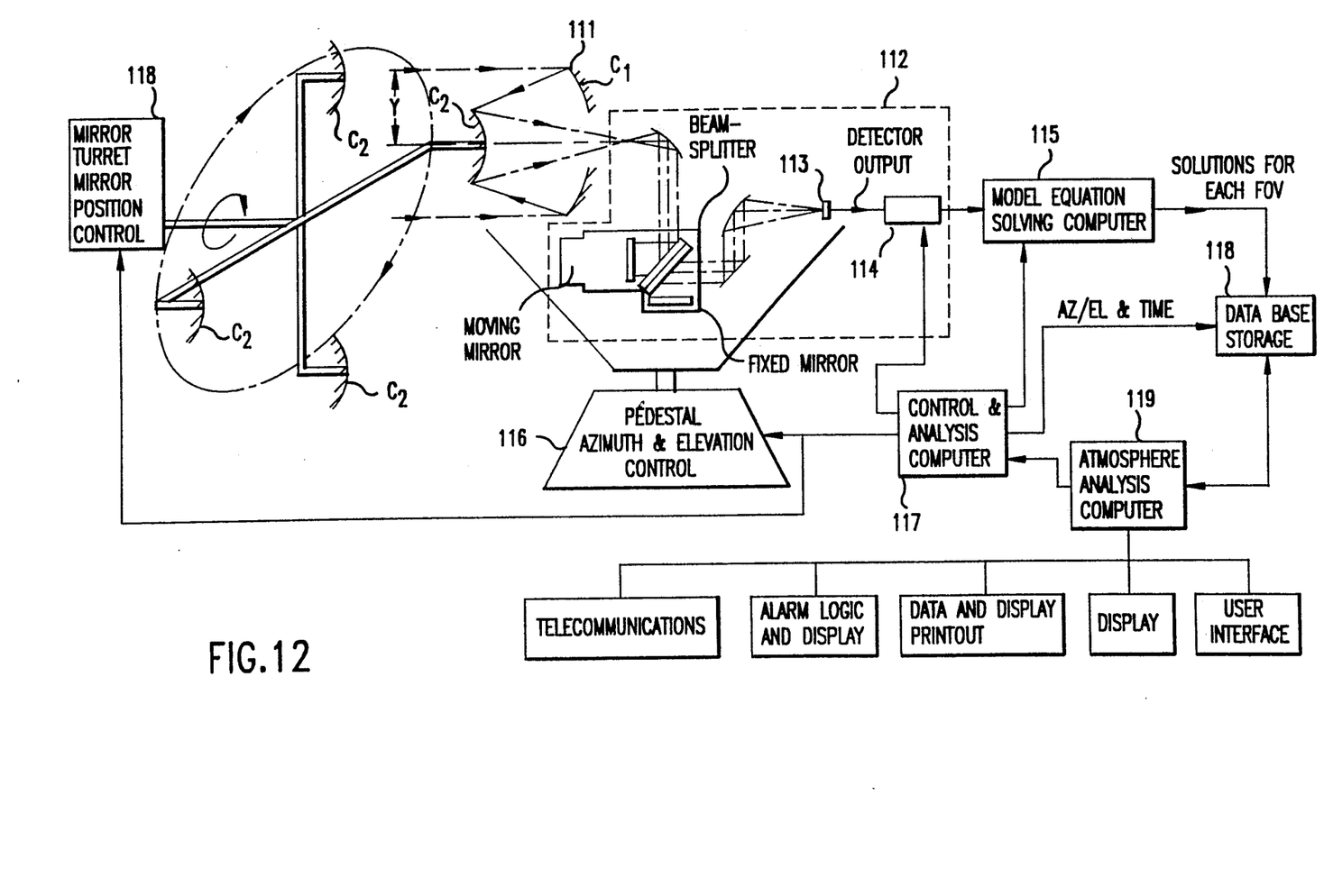
FIG. 12 is a block diagram of an arrangement of suitable components of an apparatus for carrying out the present method.

The components of an apparatus for carrying out the present method are commercially available and need not be described in detail herein. FIG. 12 shows a block diagram of a suitable apparatus. As shown in FIG. 12, a collector, generally 111, which is suitably a folded parabolic optical antenna (Cassegrain), functions as the radiation-gathering device (see 98 of FIG. 9) and collects the IR radiation along any FOV, whether the reference FOV, or any subsequent FOV. This collector is fitted with means for varying the FOV angle, making the FOV wider or narrower to achieve appropriate FOV resolution. For example, the convex mirrors $C_2$ can be used to control the focal length of the entire collector optics, which focal length determines the angle of the FOV. To achieve this capability, several such convex mirrors $C_2$, each with a different curvature, can be placed on a motor-controlled mirror turret 118 and the appropriate mirror is aligned in place along the collector optics to select the proper FOV. The turret consists of rotatable arms controlled by a motor, which controls the position of the arms, as is well known in the art. Mirrors of different curvatures placed on each arm are thus moved into position, as needed.

Since the IR power density must be measured at a number of different wavelengths, as explained above, it is necessary to provide means for separating the received IR into discrete wavelengths. While this may be done with IR filters, in view of the number of wavelengths involved, the number of filters would, likewise, be quite great, and, hence, the use of such a large number of filters especially with each having a very narrow band pass is not usually practical for most applications. Accordingly, in order to provide the number of discrete wavelengths required for a large number of equations, again, for greater resolution, a device other than filters must be provided, and the preferred device in this regard is the Fourier Transform Infrared spectrometer (FTIR), indicated in FIG. 12 by the general number 112. This device is well known in the art and is described above in connection with FIG. 4. A suitable combined Fourier Transform Infrared spectrometer, including a suitable DTGS or MCT detector 113, is manufactured by the Midac Corporation under the mark MIDAC.

The output of the detector is sent to the FTIR computer 114, which yields the values of power densities for a plurality of wavelengths. This plurality of output values, which contains the FOV signature, is applied to a Model Equation Solving computer 115 and serves as the column vector of $W_j$ in the model equations, as explained above. The solution of these equations is, as explained, the set of temperature and humidity values for the segments along the FOV.

For controlling the azimuth of the scan and the elevation of the scan, the collector and spectrometer may be mounted on a conventional gimbaled pedestal 116 and can provide movement of the FOV at desired speeds in desired angles of azimuth and in desired angles of elevation. The pedestal is controlled by a Control and Analysis Computer 117 for producing scanning as described above. This computer 117 is also responsible for controlling FOV resolution by controlling the mirrors which determine the FOV angle. That computer can be any conventional computer suitable for accepting a task program capable of movement of the pedestal and the turret. In addition, the Control and Analysis Computer supplies the azimuth, elevation, time and FOV resolution data to the Data Base Storage 118 for storage of the cell data. As previously discussed, the other cell data (temperature, humidity, range and range resolution) are supplied by the Model Equation Solving Computer 115. The Control and Analysis Computer controls the timing and synchronization of the entire system. The atmosphere analysis computer 119 computes atmospheric data based on the available temperature/humidity/time data base in the data storage computer.

The output of the atmosphere analysis computer 119 can be to a variety of operations. For example, the output may be either the two-dimensional or three-dimensional display, as noted above, or it may simply be an alarm to alert personnel to an impending hazard, or it may be a permanent printout of the temperature/humidity profiles, or it may simply be sent by a telecom system to some remote place for further use, all of which is shown in FIG. 12.

When some of the fields of view are disposed in selected azimuths and some in selected elevation, a combined display of the calculated values of temperature and humidity for each field of view provides at least a two-dimensional display thereof.

Of course, for particular applications, it may not be necessary for the fields of view to encompass an azimuth of 360° with respect to spectrometer. For example, where an airport is bounded by mountains, on several sides, and the flight paths are only in one or two directions, it may be necessary only to examine the weather conditions in those one or two directions rather than in 360° azimuth. However, even in these limited cases, an azimuth of at least 20° and an elevation of at least 7° will be used, since otherwise important weather disturbances, such as wind shear, may not be detected. However, to be sure that such disturbances are detected, it is preferable that the azimuth is at least 45° and the elevation is at least 10°, and more preferably that the azimuth is at least 60° and the elevation is at least 20°.

However, the fields of view will normally be received by scanning a predetermined angle of azimuth and a predetermined angle of elevation. For example, for most airports, and the like, the scanning will be up to 360° in azimuth and up to 45° in elevation. For many airports, the scanning will be sufficient with 360° in azimuth and up to about 40° in elevation. However, the scanning may be temporarily locked into an angle of azimuth of less than 360° and an elevation of less than 45° for sector scanning of a selected span of azimuth and elevation. The computer can be set for locking into that temporary scan by predetermined limits of the discontinuity of, for example, temperature and humidity, or it can be locked into preset angles of azimuth and elevation for such sector scanning, e.g. a temporary azimuth of 45° and a temperature elevation of 20°.

The scanning may be by scanning a complete elevation, i.e. at one azimuth, and then scanning the next adjacent complete elevation, i.e. at a next adjacent azimuth, but it is preferred that the scanning be such that when one preceding scan of 360° azimuth at one elevation is completed, the succeeding scan of 360° azimuth is completed at a different elevation from the preceding scan. Generally, that different elevation will be no more than about 5°, preferably no more than about 3°, and usually about 1°.

As can be appreciated from the foregoing, the present method has wide applications. A very significant application is that of detecting microbursts or wind shear at or near an airport, based on a ground installation at or near an airport. The method is also most useful for detecting tornadoes and may be used at strategic locations in areas subject to tornadoes. Likewise, the method may be used for detecting hurricanes, especially as the hurricanes approach a shore, so as to give a precise track of the hurricane. The method may be also used for detecting weather patterns in predicting weather changes.

In addition to such weather occurrences, the method may be used to detect forest fires or concentrations of pollution. It may also be used for detecting the presence, path and direction of an approaching aircraft. The method may also be applied to tracking snow storms, particularly when a snow storm is approaching an airport.

Thus, the method is applicable to any use where the determining of humidity and temperature of atmospheric air at different distances along elevations above ground level is required and is not limited to the specific examples given above.

In addition, the temperature/humidity profiles obtained by the present method may be sent by telemetry for use at a distant location. For example, an impending wind shear hazard alarm and coordinates as computed at a ground installation near an airport may be sent by telemetry to an approaching aircraft so that the approaching aircraft may steer around that wind shear.

Thus, it will be apparent that the invention is not limited to the examples discussed above but is applicable to many variations thereof, and that the invention extends to the spirit and scope of the annexed claims.

What is claimed:

1. A method of determining the humidity and temperature of atmospheric air at selected distances along a field of view in atmospheric air by passive IR spectrometry, comprising:
   (1) providing an IR spectrometer disposed in atmospheric air;
   (2) measuring the values of a plurality of IR power densities received by the spectrometer along a single field of view at a plurality of at least five discrete, selected IR wavelengths;
   (3) providing a set of equations which equate the measured IR power density to functions of temperature and humidity at the selected wavelengths; and
   (4) calculating from the set of equations the temperature and humidity of the atmospheric air along the field of view at selected range segments along the field of view using approximated values of temperature and humidity along the field of view.

2. The method of claim 1 wherein at least 10 discrete wavelengths are used.

3. The method of claim 2 wherein at least 20 discrete wavelengths are used.

4. The method of claim 1 wherein the set of equations is a set of a plurality of simultaneous equations, and the set of equations is solved by iteration.

5. The method of claim 4 wherein the equations are non-linear equations which provide IR power density as a function of temperature and humidity at a selected wavelength.

6. The method of claim 1 wherein the temperature and humidity are calculated for a plurality of fields of view and the approximated values for a succeeding field of view are values of temperature and humidity determined for an adjacent preceding field of view.

7. The method of claim 6 wherein some of the plurality of fields of view are disposed in selected azimuths and some is selected elevations and the calculated values are displayed in at least two dimensions.

8. The method of claim 7 wherein the spectrometer is caused to repetitively scan the selective azimuths and elevations such that real time weather mapping at said selected distances from the spectrometer is provided and the calculated values are displayed in three dimensions.

9. A method of determining the humidity and temperature of atmospheric air at selected distance along a field of view in atmospheric air by passive IR spectrometry, comprising:

(1) providing an IR spectrometer disposed in atmospheric air;

(2) measuring the values of temperature and humidity of air at about ground level at each of a series of positions spaced along a generally radial path extending from near the spectrometer;

(3) directing the spectrometer to a reference field of view extending near said path;

(4) measuring the values of IR power density received by the spectrometer along the reference field of view at a plurality of discrete, selected wavelengths;

(5) providing a set of equations which equate the measured IR power density to functions of temperature and humidity at the selected wavelengths; and (6) calculating from the set of equations the temperature and humidity of the atmospheric air along the reference field of view at selected range segments using the values of temperature and humidity measured along said path as first approximations for solution of the set of equations.

10. The method of claim 9 wherein at least 5 discrete wavelengths are used to provide respective values of the power density.

11. The method of claim 10 wherein at least 10 discrete wavelengths are used.

12. The method of claim 10 wherein at least 20 discrete wavelengths are used.

13. The method of claim 9 wherein the temperature and humidity are calculated for a plurality of fields of view and the set of equations for each field of view is solved using the values of temperature and humidity calculated for an adjacent preceding field of view as first approximations.

14. The method of claim 13 wherein some of the plurality of fields of view are disposed in selected azimuths and some in selected elevations such that a combined display of calculated values provides at least a two-dimensional display thereof.

15. The method of claim 14 wherein the spectrometer is caused to repetitively scan selected azimuths and elevations such that real time weather mapping at said selected distances from the spectrometer is provided in a three-dimensional display.

16. The method of claim 13 wherein the power density for each field of view is received by scanning a predetermined angle of azimuth and predetermined angle of elevation.

17. The method of claim 16 wherein the scanning is up to 360° in azimuth and up to 45° in elevation.

18. The method of claim 17 wherein the scanning is temporarily locked into an angle of azimuth of less than 360° and an angle of elevation less than 45° for temporary sector scanning of a selected span of azimuth and elevation.

19. The method of claim 18 wherein the azimuth and elevation of said sector scanning are determined by selected limits of humidity and temperature.

20. The method of claim 16 wherein when one preceding scan of 360° azimuth is completed, a succeeding scan of 360° azimuth is completed at a different elevation from the preceding scan.

21. The method of claim 20 wherein said different elevation is no more than about 5°.

22. The method of claim 21 wherein said different elevation is no more than about 3°.

23. The method of claim 22 wherein said different elevation is about 1°.

24. The method of claim 16 wherein the said scanning is continuously conducted until a significant temperature or humidity discontinuity is detected within a determinable angle of azimuth and angle of elevation and scanning is thereafter temporarily conducted within that determinable angle of azimuth and angle of elevation.

25. The method of claim 9 wherein the discrete wavelengths are provided by passing the IR radiation received from each field of view through a Fourier Transform IR spectrometer.

26. The method of claim 9 wherein the equations are non-linear equations.

27. The method of claim 9 wherein the set of equations is solved to an accuracy of convergency such that the solution of each equation provides a value within 15% of the values of the solutions of all other equations in the set.

28. The method of claim 9 wherein the length of the path is at least 5 km.

29. The method of claim 28 wherein the length of the path is at least 10 km.

* * * * *